Dec. 8, 1964  L. BRADT ETAL  3,160,115
TOW TRUCK SYSTEM
Filed Feb. 25, 1963  2 Sheets-Sheet 1

INVENTORS
LYNN BRADT
JOHN G. DORRANCE
BY
Arthur H. Seidel
ATTORNEY

Dec. 8, 1964    L. BRADT ETAL    3,160,115
TOW TRUCK SYSTEM
Filed Feb. 25, 1963    2 Sheets-Sheet 2

INVENTORS
LYNN BRADT
JOHN G. DORRANCE
BY
Arthur H. Seidel
ATTORNEY 3,160,115
TOW TRUCK SYSTEM
Lynn Bradt, Easton, Pa., and John G. Dorrance, Phillipsburg, N.J. (both % SI Handling Systems, Inc., Belview Road, Phillipsburg, N.J.)
Filed Feb. 25, 1963, Ser. No. 260,700
16 Claims. (Cl. 104—172)

This invention relates to a tow truck system, and more particularly, to a tow truck system wherein a reference surface is provided with a slot through which a tow pin on a tow truck is adapted to extend for cooperation with means for propelling the tow truck along the slot.

Heretofore, a substantial number of tow truck systems have been provided. The tow truck systems provided heretofore generally provide a track in a floor which requires the floor to be provided with a recess having a depth of between 8" to 14" to accommodate the track. Obviously such a system is not adoptive for use on a floor above the ground floor of a building. Hence, there have been numerous attempts heretofore to provide a tow truck system wherein the depth of the recess in the floor is reduced.

The prior art attempts to solve this problem have reduced the depth of the recess to approximately 8". The tow truck system of the present invention reduces the depth of the recess in the floor necessary to accommodate the track to approximately 2". Hence, the tow truck system of the present invention may be used on any floor of a building. Further, the tow truck system of the present invention has such a shallow depth that it is readily adaptable for mounting directly on a reference surface, such as a floor, while still permitting traffic to pass thereover. Hence, the floor mounted tow truck system of the present invention does not interfere with the ability of forklift trucks and other vehicles to pass transversely across the track.

In solving this long standing problem associated with the required depth for a recess in a reference surface to accommodate a track, the present invention includes the provision of a novel low silhouette pusher trolley. The pusher trolleys are provided with a means extending between and interconnecting two adjacent trolleys in a manner so that the interconnecting means lies within the plane of the trolleys. Preferably, an idler trolley is interconnected between two adjacent pusher trolleys. The idler trolleys preferably have a width less than one-half the width of pusher trolleys.

The pusher and idler trolleys are provided with wheels in two mutually perpendicular planes for cooperation with mating contact surfaces on the track. The tow truck system of the present invention is particularly useful in warehouses and the like wherein the tow truck system may have a length which is very substantial such as a length of five thousand feet. In order to cause the trolleys to move along the track so that the pusher trolleys may propel a tow truck supported by the reference surface along the slot in the reference surface, a means is provided for cooperation directly with the trolleys. The last mentioned means may include an endless belt having projecting fingers which directly contact and push some of the trolleys in the area of the endless belt. The endless belt is preferably positioned adjacent the end of the tow truck system. However, the tow truck system of the present invention may be in the form of an endless loop wherein one portion of the loop is designated as the beginning and an adjacent portion is designated as the end of the loop insofar as movement of trucks is concerned.

It is an object of the present invention to provide a novel tow truck system.

It is another object of the present invention to provide a novel tow truck system which substantially reduces the depth of a recess in a reference surface for accommodating a track.

It is another object of the present invention to provide a novel pusher trolley.

It is another object of the present invention to provide a novel tow truck system which enables the system to be supported by any floor of a building.

It is another object of the present invention to provide a novel tow truck system wherein the depth of the track is sufficiently low to permit the track to be mounted on a floor.

It is still another object of the present invention to provide a tow truck system which includes a plurality of pusher and idler trolleys interconnected in a novel manner so that all trolleys may be rollingly supported by the track.

Other objects will appear hereinafter.

For the purpose of illustrating the invention there is shown in the drawings forms which are presently preferred; it being understood, however, that this invention is not limited to the precise arrangements and instrumentalities shown.

Referring to the drawing in detail, wherein like numerals indicate like elements, there is shown in FIGURE 1 a tow truck system designated generally as 10.

Tow trucks designated generally as 12 and 14 are adapted to be propelled along a main slot 18 in a reference surface such as a floor 16 of the tow truck system 10. The main slot 18 may have a plurality of shunt slots extending therefrom at an acute angle as is well known in the art.

Figure 1:
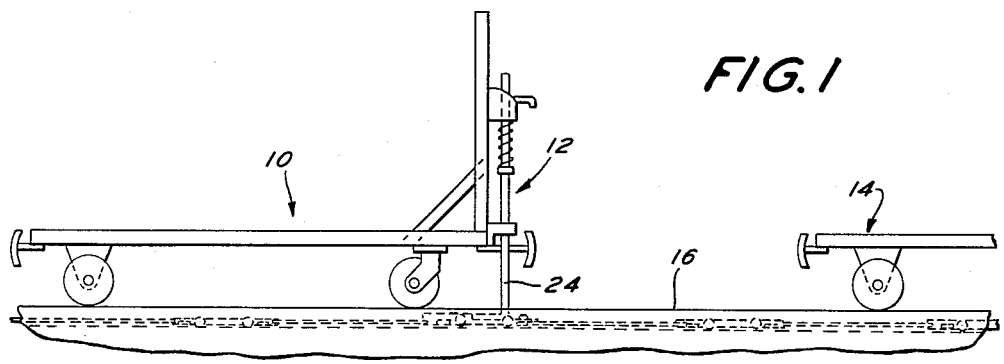
FIGURE 1 is a side elevation view of tow trucks adapted to be propelled by the tow truck system of the present invention.
Figure 2:
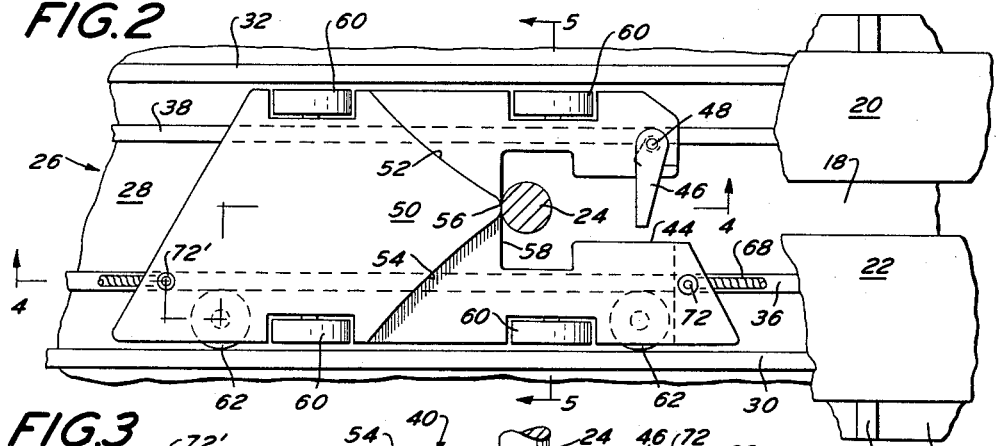
FIGURE 2 is a top plan view with portions broken away for purposes of clarity thereby illustrating a top plan view of a pusher trolley in accordance with the present invention.
Figure 5:
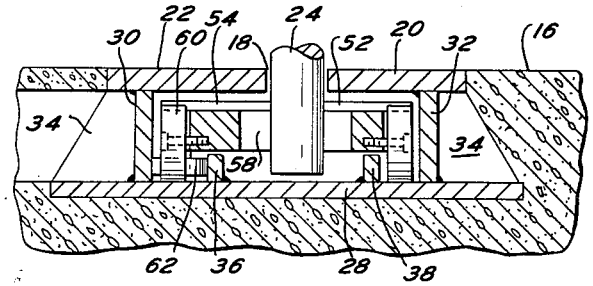
FIGURE 5 is a sectional view taken along the lines 5—5 in FIGURE 2.

As shown more clearly in FIGURES 2 and 5, the slot 18 is defined by the space between planar reference plates 20 and 22. The uppermost surface of the plates 20 and 22 is flush with the floor 16. The trucks 12 and 14 have a tow pin 24 on a front portion thereof which is adapted to extend through the slot 18 for cooperation with a propelling means. The trucks 12 and 14 are preferably provided with wheel means and an operator to facilitate withdrawal of the tow pin 24 when desired.

Below the reference surface defined by the uppermost surface of the plates 20 and 22 and the floor 16, there is provided a track 26. The track 26 includes a flat plate disposed in a plane parallel to the plane of the reference surface. The plate 22 is connected to the plate 28 by a wall 30 and spaced struts 34. The plate 20 is connected to the plate 28 by a wall 32 and spaced struts 34. All of the plates, struts and the walls 30 and 32 are preferably made from metal with welded joints being provided.

A wall 36 extends from the plate 28 toward the plate 22. Wall 36 is spaced from and parallel to wall 30. A wall 38 extends from the plate 28 toward the plate 20. Wall 38 is spaced from and parallel to wall 32. Walls 36 and 38 have a height substantially less than the height of the walls 30 and 32. In the preferred embodiment of the present invention, the distance between the reference surface and the plate 28 is approximately 2" thereby enabling the track 26 to be disposed in any floor of a multistory building.

Figure 3:
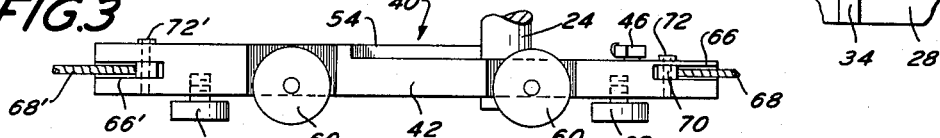
FIGURE 3 is a side elevation view of a pusher trolley.
Figure 4:
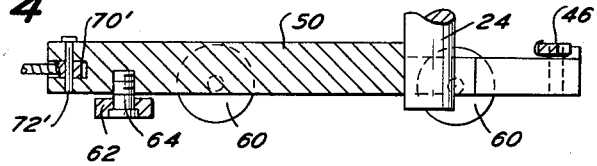
FIGURE 4 is a sectional view taken along the lines 4—4 in FIGURE 2.

A plurality of interconnected pusher trolleys 40 are adapted to ride on the track 26. As shown more clearly in FIGURES 2, 3 and 4, the trolley 40 includes a body 42 having a T-shaped recess 44 in a front end thereof. A lug 46 is rotatably supported by the body 42 for rotation about pin 48. Lug 46 is spring biased against a limit stop to the position shown in FIGURE 2 and can only rotate in a clockwise direction in FIGURE 2 to permit a tow pin 24 to enter the recess 44.

The pusher trolley 40 is provided with a raised body portion 50 having angled sides 52 and 54 converging toward the apex 56. Apex 56 lies in the same plane as the rear wall 58 of the slot 44. The trolley 40 is provided with a plurality of wheels 60 which rotate about axes substantially parallel to the reference surface. As illustrated, the trolley 40 is provided with four such wheels 60. It will be noted that the trolley 40 has a width which is greater than the distance between the walls 36 and 38 and that the body 42 is provided with recesses for accommodating the wheels 60.

The body 42 is also provided with a plurality of wheels 62. The wheels 62 rotate about axes which are generally perpendicular to the reference surface. The diameter of wheels 62 is substantially equal to but slightly less than the distance between the juxtaposed surfaces on the walls 30 and 36. It will be noted that the wheels 62 are closer to the front and rear end of the body 42 than the wheels 60. The wheels 62 are rotatably supported by studs depending from the body 42.

A slot 66 is provided in the front end of the body 42. A connector means such as a cable 68 terminating in a ring 70 extends into the slot 66. A pin 72 extends through a hole in the body 42 and through the ring 70. The longitudinal axis of the last mentioned hole is generally perpendicular to the plane of the slot 66. Due to the horizontal extent of the slot 66, the cable 68 may swing about the pin 72 through a limited arc.

A similar connector means is interconnected with the rear end of the body 42. Such similar connector means is provided with corresponding primed numerals and, therefore, need not be described in detail. Cable 68 is adapted to be interconnected with the trolley in front of trolley 40. Cable 68' is adapted to be interconnected with the trolley to the rear of trolley 40. As shown more clearly in FIGURE 3, the cable 68 and 68' lie within the upper and lower planes defined by the trolley 40. The particular location of the pins 72 and 72' may be varied across the width of the body 42. However, the distance of the pins 72 and 72' from the longitudinal axis of the trolley 40 should be substantially equal.

Figure 6:
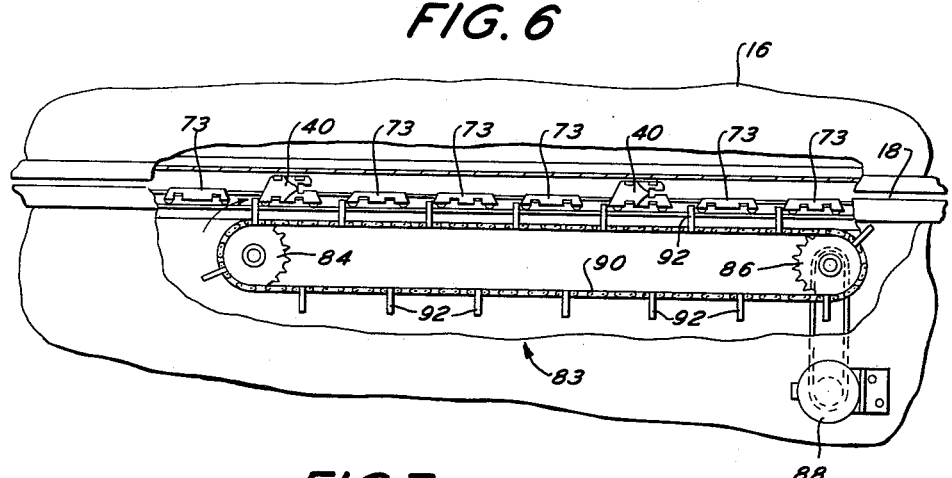
FIGURE 6 is a top plan view of a tow truck system in accordance with the present invention, with portions broken away for purposes of clarity to illustrate the means for moving pusher trolleys along the track.

As shown more clearly in FIGURE 6, the trolleys 40 are staggered in a manner so that several idler trolleys 73 are disposed between two adjacent pusher trolleys 40. Each of the trolleys are interconnected with the next adjacent trolley by a connector means such as the cables 68 and 68'.

Figure 7:
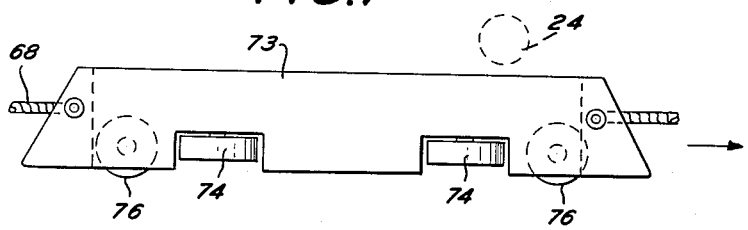
FIGURE 7 is a top plan view of the idler trolley illustrated in FIGURE 6.
Figure 8:
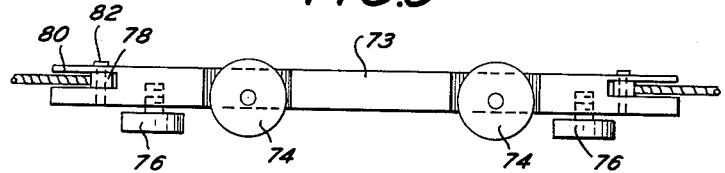
FIGURE 8 is a side elevation view of the idler trolley shown in FIGURE 7.

As shown more clearly in FIGURE 7, the idler trolleys 73 have a body which is adapted to be rollingly supported by one-half of the track 26. The width of the body of the idler trolleys 73 is slightly less than one-half the width of the pusher trolleys 40 so that a tow pin 24 will not contact the idler trolleys 73 as will be evident from the illustration in FIGURE 7.

The idler trolleys 73 are provided with two or more wheels 74 which rotate about axes substantially parallel to the reference surface. Hence, the wheels 74 rollingly engage the plate 28. The idler trolleys 73 are also provided with a pair of wheels 76 which rotate about axes substantially perpendicular to the reference surface. Hence, the wheels 76 correspond with the wheels 62 on the pusher trolley 40 and wheels 74 correspond with wheels 60 of the pusher trolley 40.

The idler trolleys 73 of FIGURE 7 may be interconnected with the pusher trolley 40 in FIGURE 2 by means of the cable 68. The front and rear ends of the idler trolleys 73 are provided with a slot such as slot 80. The ends of the cable 68 adjacent the idler trolleys 73 also terminates in a ring 78 which extends into the slot 80. A pin 82, comparable to pin 72, extends through a hole and the ring 78.

A propelling means designated generally as 83 and shown more clearly in FIGURE 6 is provided along an end portion of the system 10 to cause the trolley to be propelled along the track 26. Such means may include a pair of spaced sprockets 84 and 86 adapted to rotate about axes generally perpendicular to the reference surface. A motor 88 is coupled to the sprocket 86 to rotatingly drive the same. The sprockets 84 and 86 may be interconnected with an endless member such as chain 90. Chain 90 is provided with a plurality of rigid fingers 92. In the area of the propelling means 83, the wall 30 may be provided with a slot through which the fingers 92 are adapted to extend. As shown more clearly in FIGURE 6, the fingers 92 are adapted to engage the rearmost surface on the trolleys and mechanically push the same.

Figure 9:
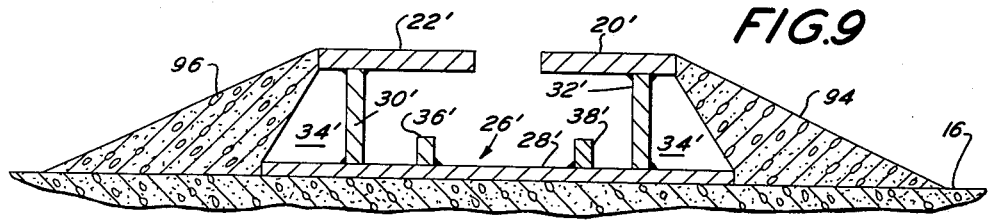
FIGURE 9 is a transverse sectional view corresponding to FIGURE 5 but illustrating another embodiment of the present invention wherein the tow truck system is mounted on a reference surface.

The concepts of the present invention may take the form illustrated in FIGURE 9 wherein the track 26' is supported directly on the floor 16. The track 26' is identical with track 26 and therefore need not be described in detail. In track 26, the walls 30 and 32 are provided with reinforcing struts 34 at spaced points therealong. Similar struts 34' may be provided in the embodiment in FIGURE 9. Sloping ramps 94 and 96 may be provided on either side of the track 26' to facilitate traffic thereacross. Since the depth of the track 26' is only about 2", forklift trucks and the like may traverse the floor mounted track with little difficulty. The embodiment illustrated in FIGURE 9 is often desirable when the floor is of such a nature that it is uneconomical or not feasible to provide a channel therein for receiving the track. For example, many floors are supported by steel I-beams which normally preclude the provision of a channel in the floor for receiving the track.

The operation of the tow truck system of the present invention and its cooperation with the tow pin of a tow truck is well known to those skilled in the art. For example, see U.S. Patent 2,619,370 issued to E. J. Leger. Hence, it is not deemed necessary to explain the operation of the system in detail.

The use of idler trolleys, per se, in a tow truck system is well known and need not be described in detail. The tow truck system of the present invention enables the connecting means to be in the form of rigid rods instead of cables as illustrated. The provision of wheels rotating about mutually perpendicular axes facilitates the use of a tow truck system having sharper corners than those utilized heretofore. Each of the walls 36 and 38 prevents foreign matter such as dirt which enters the track through the slot 18 from entering that portion of the track on which the wheels rollingly engage the track.

Referring to FIGURE 5, it will be noted that the lowermost end of the tow pin 24 is below the uppermost surface of the walls 36 and 38. Hence, the walls 36 and 38 will prevent the truck from being inadvertently diverted into a shunt slot unless the tow pin has been raised to a position wherein the lowermost end of the tow pin 24 may be cammed by the surfaces 52 or 54 into the desired shunt slot. The tow pin 24 is first lifted above the upper edge of the wall 58. The movement of the tow pin from the apex 56 is then such that the tow pin 24 may engage one of the angled sides 52 and 54. This may be accomplished by providing a slight jog in the slot 18.

It is within the scope of the present invention to eliminate wheels 62 and 76. These wheels facilitate ease of the trolleys along arcuate portions of the track. If these wheels are eliminated, any arcuate portions of the track will be provided with rotatable members on at least one side wall thereof.

The present invention may be embodied in other specific forms without departing from the spirit or essential attributes thereof and, accordingly, reference should be made to the appended claims, rather than to the foregoing specification as indicating the scope of the invention.

We claim:

1. In a tow truck system comprising means defining a reference surface having a slot therein through which a tow pin on a truck is adapted to extend, means defining a track in line with said slot, a plurality of pusher trolleys riding on said track, passage means extending from one edge of said pusher trolleys substantially along its center line for receiving a tow pin, a tow pin pushing surface at one end of said passage means, means extending between and interconnected with adjacent trolleys, said last-mentioned means being in a plane approximately midway between a top and a bottom surface of said pusher trolleys and offset with respect to the center line of said track, said plane being substantially parallel to said reference surface, and means for cooperating directly with said trolleys for causing said trolleys to move along said track.

2. In a tow truck system comprising means defining a reference surface having a slot through which a tow pin is adapted to extend, means defining a track below and in line with said slot, said track including first and second walls defining the width of said track, a third wall between said first and second walls, the distance between said third wall and said first wall being substantially less than the distance between said slot and said first wall, said third wall having a height less than the height of said first wall, and said track including a supporting surface between said first and third walls on which the wheels of a trolley may be rollingly supported.

3. In a system in accordance with claim 2 wherein said supporting surface includes a flat planar surface extending between said first and second walls and lying in a plane substantially parallel to the plane of said reference surface.

4. A system in accordance with claim 2 including a fourth wall between said second and third walls, said fourth wall being closer to said second wall than to said third wall, said fourth wall having a height substantially equal to the height of said third wall.

5. In a tow truck system comprising a floor, a recess in said floor, first and second plates flush with said floor, a third plate below said first and second plates and lying in a plane substantially parallel to the plane of said first and second plates, first and second walls extending respectively between said third plate and said first and second plates, said first and second walls being spaced from one another defining the width of a track, said first and second plates being spaced from one another to define a slot through which a tow pin may extend, and a third wall, said third wall extending from said third plate toward said first plate, said third wall having a height less than the height of said first and second walls, and said third wall being parallel to but spaced from said first wall, with said third wall being closer to said first wall than to said second wall, and said track including a supporting surface between said first and third wall on which the wheels of a trolley may be rollingly supported.

6. In a tow truck system comprising means defining a reference surface having a slot therein through which a tow pin on a truck may extend, a track below and in line with said slot, a pusher trolley supported by said track, said pusher trolley including means for accommodating a tow pin extending through said slot, wheels on said pusher trolley, some of the wheels on said pusher trolley lying in a plane disposed substantially perpendicular with respect to the plane of other wheels on said pusher trolley, and surfaces on said track for rollingly engaging the wheels on said pusher trolley, said surfaces including a wall having a height less than the distance between said track and said reference surface.

7. In a system in accordance with claim 6 wherein said wall is spaced from a substantially parallel surface of said track by a distance substantially equal to the diameter of some of said wheels.

8. In a system in accordance with claim 6 including a second pusher trolley, at least two idler trolleys, said second pusher trolley and idler trolleys being supported by said track, said idler trolley being between said first and second pusher trolleys, each trolley being connected to the next trolley by a discrete connecting member.

9. In a system in accordance with claim 8 wherein the ends of said connecting members are supported by said trolleys for a limited amount of swinging about an axis substantially perpendicular to said reference surface.

10. In a system in accordance with claim 8 wherein said idler trolleys have a width which is less than one-half the width of said pusher trolleys.

11. In a system in accordance with claim 6 wherein said reference surface is a floor, and said track being mounted on said floor.

12. In a tow truck system comprising a sub-floor track, a pusher trolley means supported by said track, said trolley having a body and wheels mounted for rotation on said body lying in substantially mutually perpendicular planes, a portion of said track including surfaces rollingly engaging said wheels, one of said surfaces being a planar bottom wall extending across the width of said track, each pusher trolley including passage means extending for one of its edges along said body for receiving a tow pin adapted to be pushed by said trolley, a tow pin pushing surface at one end of said passage means, a connector member coupled to the front end of said pusher trolley means for coupling said pusher trolley means to a second trolley means on said track, and a second connector member coupled to a rear end of said pusher trolley means for coupling said pusher trolley means to a third trolley on said track, said connector members being coupled to said pusher trolley means for swinging movement in a direction parallel to the plane of said bottom wall.

13. In a tow truck system in accordance with claim 12 including means for preventing foreign matter introduced into said track from entering the portion of said track having said surfaces.

14. A pusher trolley for use in a tow truck system comprising a body, wheels on said body, said body having a recess extending from one of its edges substantially along its longitudinal axis for receiving a portion of a tow pin adapted to be pushed by said trolley, a pivotally mounted lug on said body extending across a substantial portion of said recess, first and second connector members, said first connector member being coupled to a front end of said body, said second connector member being connected to a rear end of said body, and the point of connection of said connector members with said body being to one side of the longitudinal axis of said body.

15. A trolley in accordance with claim 14 including cam surfaces on said body, said surfaces converging toward said lug to an area adjacent said recess, said surfaces lying in a plane above the plane of said recess.

16. A pusher trolley for use in a tow truck system comprising a body, wheels on said body, said body having a recess extending from one of its edges along its length for receiving a portion of a tow pin adapted to be pushed by said trolley, a two pin pushing surface on one end of said recess, means on said body for locking a tow pin within said recess, first and second connector members, said first connector member being coupled to a front end of said body, and said second connector member being connected to a rear end of said body.

References Cited in the file of this patent

UNITED STATES PATENTS

| | | |
|---|---|---|
| 1,440,661 | Dickinson | Jan. 2, 1923 |
| 2,068,403 | Ekstrom | Jan. 19, 1937 |
| 2,371,624 | Hudson | Mar. 20, 1945 |
| 2,602,196 | Pelton | July 8, 1952 |
| 2,619,370 | Leger | Nov. 25, 1952 |
| 2,808,146 | Leach | Oct. 1, 1957 |
| 3,051,097 | Wyman | Aug. 28, 1962 |
| 3,103,896 | Zebley et al. | Sept. 17, 1963 |